Aug. 21, 1934.  E. RUBINI ET AL  1,970,627
DUMP VEHICLE
Filed Sept. 20, 1933  2 Sheets-Sheet 1

Eligio Rubini
Paul Quartorone
INVENTORS.

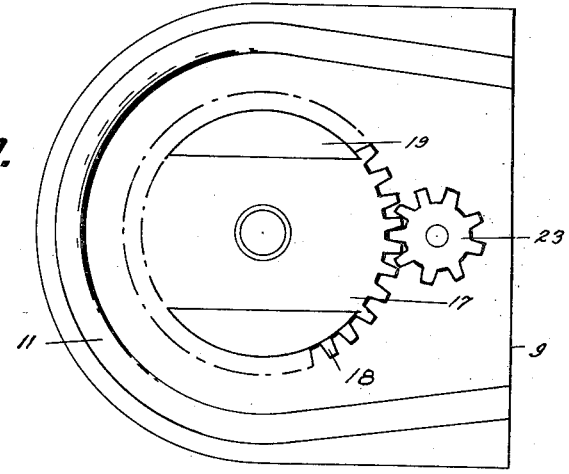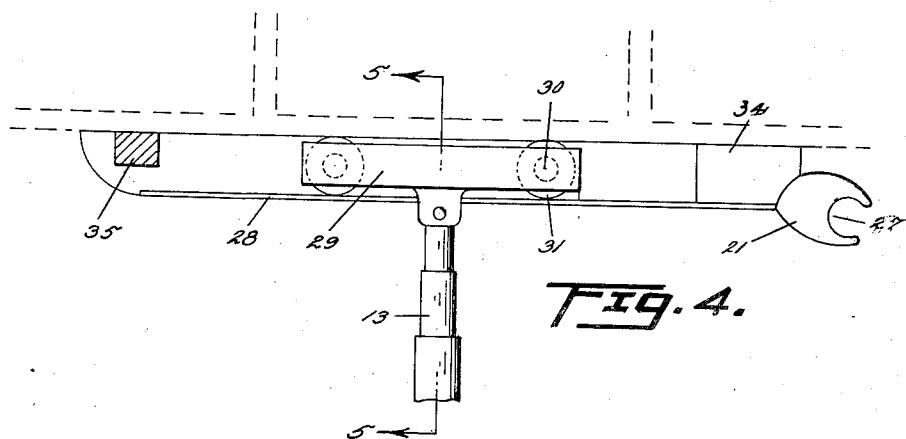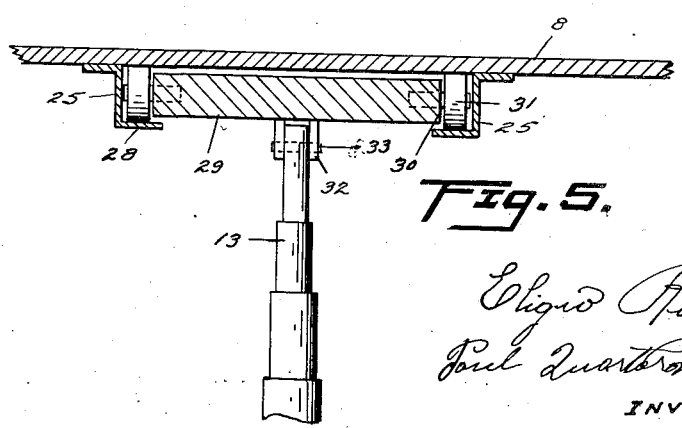

Patented Aug. 21, 1934

1,970,627

UNITED STATES PATENT OFFICE 1,970,627

DUMP VEHICLE

Eligio Rubini and Paul Quartorone, Toronto, Ontario, Canada, assignors of one-third to Francis Di Bartolo, Buffalo, N. Y.

Application September 20, 1933, Serial No. 690,214

3 Claims. (Cl. 298—9)

The invention relates to improvements in dump vehicles as described in the present specification and shown in the accompanying drawings that form a part of the same.

The invention relates to that type of dump vehicle in which the body is adapted to be rotated to permit of its being tipped in any required direction and one object of the invention is to provide a connection between the hoisting element and the body which in the hoisting process will be automatically moved away from the centre of the body towards the front end thereof, which is the end being raised, and thereby facilitate the tilting; to provide a dump vehicle in which the operating parts are so arranged that the body in its normal position will not be unduly raised in relation to the chassis; and generally to provide a simple and efficient dump vehicle constructed of few parts which will not readily get out of order and which will be inexpensive to construct and operate.

The invention consists in the novel features of construction arrangements and combinations of parts as described in the present specification and more particularly pointed out in the claims for novelty following.

In the drawings, Figure 1 is a side elevation, partly in vertical section and other parts shown dotted, of a portion of a truck embodying our invention, the body being shown in a partially raised position.

Figure 3 is a plan view of the platform and turntable.

Figure 4 is an enlarged side elevation of the under carriage which supports the body.

Figure 5 is a cross sectional view taken on the line 5—5 of Figure 4.

Like numerals of reference indicate corresponding parts in the various figures.

Figure 1:
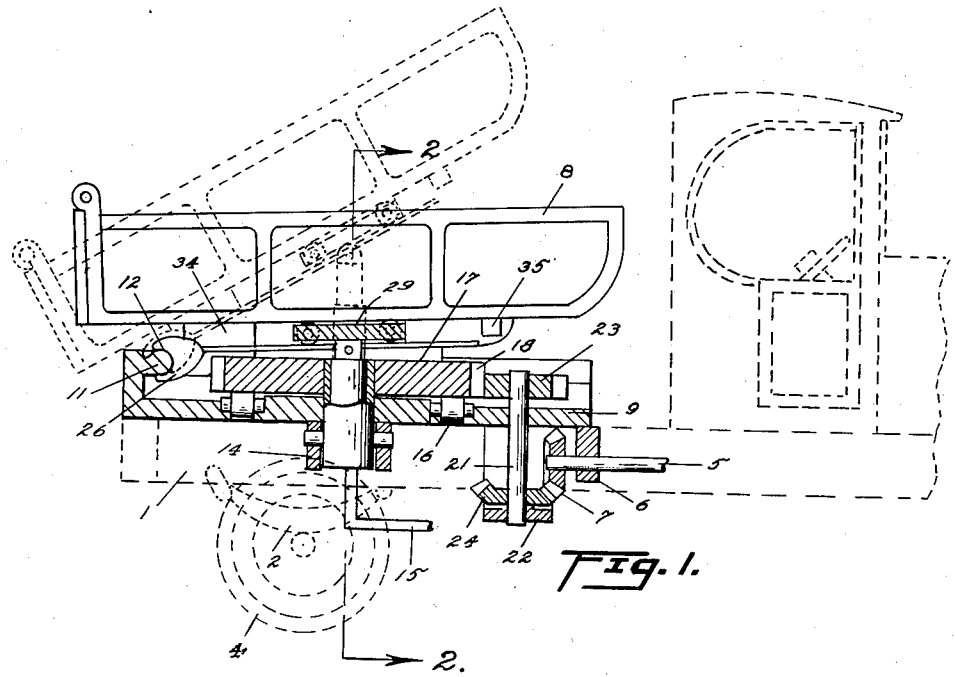
Figure 2:
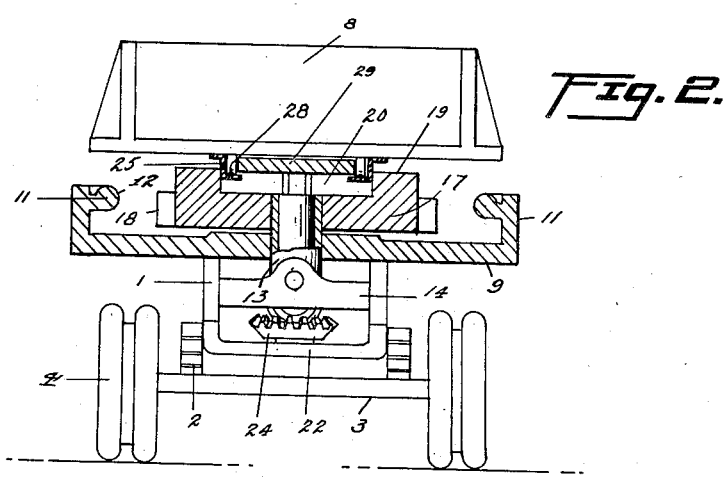
Figure 2 is a cross sectional view taken on the line 2—2 of Figure 1.

Referring to the drawings, in the preferred embodiment of our invention which we have selected for purposes of illustration the chassis 1 is mounted on springs 2 on the front and rear axles 3 which carry front and rear wheels 4, the front portion of said vehicle not being shown in the drawings.

The drive shaft 5 which at its forward end is suitably connected to the engine (the latter not being shown in the drawings) provides means for operating the elements to be described hereinafter, said shaft being extended through a bearing member 6 carried by the chassis and carrying a bevel gear 7 on the rear end thereof and positioned towards the forward end of the body 8 of the vehicle and therebelow.

A platform 9 is rigidly mounted on the chassis and has an upstanding wall 10 extending around the sides and rear thereof, from which wall extends inwardly at right angles thereto a flange 11 presenting an enlarged rounded inner face 12. The platform 9 has an opening substantially centrally thereof through which extends upwardly the telescopic hoist element 13 which has its base 14 rigidly secured to the chassis. A suitable pipe 15 enters the lower end of said hoist element and at its other end communicates with the mechanism by means of which the oil, or other pressure agent, is fed to the hoist for raising same.

The platform 9 is provided with a circular series of roller bearings 16 around the opening through which the hoist element projects.

A turntable 17 also having a central opening for the hoist element is supported by the platform 9 and rotates on the bearings 16, said turntable being provided with peripheral teeth 18 and also having spaced parallel upstanding flanges 19 providing a central recess 20 therebetween. A vertical shaft 21 mounted at its lower end in a suitable bearing 22 carried by the chassis and adjacent to its top end extending through the platform 9 carries at its top end a gear 23 meshing with the teeth 18 of the turnable and at its lower end carries a bevel gear 24 meshing with the bevel gear 7 mounted on the shaft 5, whereby rotary movement is imparted to said turntable.

The body 8 is provided on its under side with a carriage housing including a pair of brackets 25 extending longitudinally thereof and spaced to fit within the recess 20 between the flanges 19 so that said body will be rotated co-incidently with the turntable, said housing having rearwardly extending arms 26 provided respectively with substantially semi-circular recesses 27 adapted to extend around the rounded face 12 of the flange, or track, 11, which latter provides an anchor for the rear end of the body in the tipping operation. The housing 25 also has opposed parallel inwardly extending flanges 28 in spaced relation to the bottom of said body.

An under carriage 29 consisting of a central frame having front and rear axles 30 carrying running gear 31 operates within the carriage housing with the running gear confined between the bottom of the body 8 and the flanges 28 and bearing against said body, and said carriage is provided with centrally downwardly extending lugs 32 from the under face thereof between which is pivoted on a transverse pin 33 the top end of the telescopic hoist element 13 so that on the raising of said hoist said under carriage will be forced upwardly along the bottom of the body towards the front end thereof and facilitate the tipping of said body. The carriage housing is provided with stops 34 and 35 which limit the longitudinal movement of the under carriage.

In the operation of this invention the drive shaft 5 is rotated in the required direction when it is desired to tilt the body and through the medium of such shaft and the gears 23 and 24 the turntable is rotated until the rear end of the body 8 is in the desired position for dumping, the arms 26 in the meantime riding on the track, or flange, 11 of the platform 9, after which the hoist raising mechanism is set in motion and as the hoist is forced upwardly the under carriage 29 bears against the bottom of the body and moves forwardly therealong towards the forward end and raises said forward end against the rear end which is anchored by the engagement of the arms 26 with the track.

It will thus be apparent that means is provided for automatically moving the point of pressure of the hoisting element to one side of the longitudinal centre of the body as the tipping operation progresses with the hoisting element remaining relatively stationary.

While we have illustrated and described the preferred form of construction for carrying out our invention, this is capable of variation and modification without departing from the spirit of the invention. We, therefore, do not wish to be limited to the precise details of construction set forth, but desire to avail ourselves of such variations and modifications as come within the scope of the appended claims.

What we claim is:—

1. In a dump vehicle, the combination with a chassis, of a platform mounted on said chassis, said platform having an upstanding peripheral wall, an inwardly extending circular guide flange carried by said wall, a turntable on said platform within said flange, means for rotating said turntable, a hoist for tilting the body, said hoist extending upwardly through said platform and said turntable, a body rotatably carried by said turntable, said body having a rearwardly extending recessed arm pivotally and slidably engaging said flange, and means connecting the hoist with the body for relative sliding movement therebetween as the body is tilted by said hoist.

2. In a dump vehicle, the combination with a chassis, of a platform mounted on said chassis, said platform having an upstanding peripheral wall, an inwardly extending circular guide flange carried by said wall, a turntable on said platform within said flange, means for rotating said turntable, a hoist for tilting the body, said hoist extending upwardly through said platform and said turntable, a body rotatably carried by said turntable, a frame mounted on the under side of said body, rearward extensions from said frame engaging said flange, and a carriage pivotally secured to the hoist and operating longitudinally within said frame upon tilting movement of the body.

3. In a dump vehicle, in combination, a chassis, a platform mounted on said chassis, said platform having a peripheral wall provided with a circular inwardly extending peripheral flange, a turntable on said platform within said flange, said turntable having a recess in the top face thereof, a drive shaft on the chassis, means operatively connecting said drive shaft and said turntable for imparting rotary movement to the latter, a hoist extending upwardly through said platform and said turntable, a body on said turntable having a rearward extension therefrom engaging said flange, a carriage housing secured to the under side of said body and extending longitudinally thereof and fitting within said recess when in its lowered position, and a carriage pivotally secured to the hoist and slidable within said housing as the body is tilted.

ELIGIO RUBINI.
PAUL QUARTORONE.